(12) United States Patent
Cary

(10) Patent No.: US 6,398,235 B1
(45) Date of Patent: Jun. 4, 2002

(54) MOBILE STORAGE UNIT

(76) Inventor: Lawren Charles Cary, 2925 E. 26th Ave., Denver, CO (US) 80205

( * ) Notice: Subject to any disclaimer, the term of this patent is extended or adjusted under 35 U.S.C. 154(b) by 0 days.

(21) Appl. No.: 09/019,451

(22) Filed: Feb. 5, 1998

(51) Int. Cl.$^7$ ................................................ B62B 1/04
(52) U.S. Cl. ............................... 280/47.26; 280/47.18; 280/47.19; 280/47.35
(58) Field of Search ........................... 280/47.26, 47.19, 280/47.18, 47.27, 47.28, 47.16, 47.2, 43.35

(56) References Cited

U.S. PATENT DOCUMENTS

| | | | | |
|---|---|---|---|---|
| 2,429,797 A | * | 10/1947 | Bovenzi ..................... | 280/47.2 |
| 2,905,480 A | | 9/1959 | Giovannelli | |
| 3,118,685 A | | 1/1964 | Jordan | |
| 4,118,048 A | | 10/1978 | Spranger et al. | |
| 4,281,843 A | | 8/1981 | Johnson et al. | |
| 5,013,055 A | * | 5/1991 | Labrum .................... | 280/47.19 |
| 5,074,571 A | | 12/1991 | Reese | |
| 5,159,777 A | * | 11/1992 | Gonzalez ................. | 280/47.26 |
| 5,213,351 A | | 5/1993 | Chen | |
| 5,333,885 A | * | 8/1994 | Pullman .................. | 280/47.19 |
| 5,378,005 A | * | 1/1995 | Norton .................... | 280/47.26 |
| 5,400,448 A | * | 3/1995 | Zwickey ........................ | 5/462 |
| 5,452,908 A | | 9/1995 | Bencic | |
| 5,551,562 A | * | 9/1996 | Beretta .................... | 280/47.26 |
| 5,588,569 A | | 12/1996 | Mitomi et al. | |
| 5,588,659 A | * | 12/1996 | Boes et al. ............... | 280/47.19 |
| 5,642,898 A | * | 7/1997 | Wise ........................ | 280/47.19 |
| 5,799,958 A | * | 9/1998 | Bishop .................... | 280/47.26 |
| 5,863,055 A | * | 1/1999 | Kasravi et al. .......... | 280/47.29 |
| 5,893,572 A | * | 4/1999 | Parks ....................... | 280/47.18 |
| 5,906,381 A | * | 5/1999 | Hovatter .................. | 280/47.18 |

FOREIGN PATENT DOCUMENTS

| | | | | |
|---|---|---|---|---|
| DE | 3304577 | * | 8/1984 | ............. 280/47.18 |

\* cited by examiner

*Primary Examiner*—Brian L. Johnson
*Assistant Examiner*—Tony Winner
(74) *Attorney, Agent, or Firm*—Timothy J. Martin; Michael R. Henson; Mark H. Weygandt

(57) ABSTRACT

A mobile storage unit broadly comprises a support frame, primary and auxiliary wheel assemblies, and first and second storage shelves. The primary wheel assembly assists to position the support frame upright on a transport surface and permits movement of thereover, while the auxiliary wheel assembly movably supports the frame in a horizontal position above the transport surface. Each storage shelf is pivotally disposed on the support frame and selectively moveable between a stowed and extended positions to support a respective container for Implements. The unit may also have a single storage shelf and a removable panel insert nestably received therein. Alternatively, first and second frameworks can be provided to receive a tool box for vertical and horizontal transport, respectively, as desired.

12 Claims, 5 Drawing Sheets

MOBILE STORAGE UNIT

FIELD OF THE INVENTION

The present invention is broadly directed to a mobile storage unit adapted for use in transporting and stowing selected implements, such as a workman's tools, and the like. More particularly, the present invention concerns a mobile storage unit which is transportable across a transport surface in at least two transport modes depending upon the nature of the work involved, while still providing convenient accessibility to the stored items. To this end, the mobile storage unit is an improvement to a conventional dolly which has been specially constructed to allow for such versatility.

BACKGROUND OF THE INVENTION

Workers, such as auto mechanics, carpenters, electricians and plumbers often require a variety of tools to successfully complete their day-to-day tasks. For example, auto mechanics may require any number of different types of implements depending upon the nature of the work involved, be it transmission maintenance, brake work, drive train repair or a complete engine overhaul, to name only a few. Convenient accessibility to these tools, therefore, becomes important so that more work can be completed in a time efficient manner.

It is typical of many auto repair facilities that a mechanic's tools are stored in stand-alone tool chests comprising a plurality of storage drawers. Many of these stand-alone units include roller wheels to permit them to be moved from one location to another as desired; however, transportability becomes more and more impracticable with larger, heavier units. More often than not, then, a mechanic simply selects those tools believed to be needed for a repair only to return to the tool chest to either obtain additional tools or replace existing ones. Depending on the location and the nature of work to be performed, though, this can be quite inconvenient and time consuming, resulting in reduced efficiency. This is particularly true where a mechanic is required to be situated underneath a vehicle for maintenance or repair work.

In the past, others have recognized the need to provide mobile storage units for the convenient transportation of a variety of items. For example, U.S. Pat. No. 4,118,048 issued Oct. 3, 1988 to Spranger relates to a wheeled sample case particularly suited to the needs of traveling salesmen to permit them to conveniently store and display products to customers. Here, the sample case has a pair of open ended containers each of which is supported by one section of a two-section wheeled dolly. The dolly sections are joined together with their respective display enclosures pivotable between open and closed positions. The containers may be hinged together on one side to form sample cases and attachably connected to the dolly. A plurality of sample cases may be stacked one above the other on the dolly and aligned to pivot open simultaneously with the opening of the dolly sections.

A variety of different types of mobile tool chests have also been developed. For example, U.S. Pat. No. 5,213,351 issued May 25, 1993 to Chen et al relates to such a tool chest in the form of a built-up tool carriage provided with a plurality of internal, sliding storage drawers and molded doors for the retention of specific tools. Also, in U.S. Pat. No. 5,452,908 to Bencic issued Sep. 26, 1995, a collapsible work storage cart includes a storage chest, a tool box, and a foldable table mounted on a two-wheeled support frame. Here, the support frame functions similarly to a wheeled dolly while the cart is in a transport mode. When in a working mode, the support frame can be unfolded to provide a work table. The storage part includes a pair of enlarged wheels at one extremity of the support frame so that a user may grasp an auxiliary handle and pull the cart across a support surface. A single, smaller wheel is also located near an opposite extremity of the support frame to permit the storage cart to be placed horizontally on a support surface and moved therealong. Various other transportable storage devices are also disclosed in the following references: U.S. Pat. No. 2,905,408 to Giovannelli, U.S. Pat. No. 3,118,685 to Jordan, U.S. Pat. No. 4,281,843 to Johnson et al, U.S. Pat. No. 5,074,571 to Reese and U.S. Pat. No. 5,588,569 to Mitomi.

Despite the advantages of the aforementioned storage devices, there remains a need to provide a mobile storage unit which is more particularly suited to the needs of mechanics, carpenters, electricians and plumbers who need a variety of tools ready at their disposal. There is a further need for such a mobile storage unit which is capable of being placed in confined areas while providing sufficient storage capacity for an appreciable number of tool implements. It would also be desirable for such a mobile storage unit to allow for the transport of heavy, cumbersome objects when not used specifically as a tool carrier. The present invention is directed to meeting these needs, among others.

SUMMARY OF INVENTION

It is an object of the present invention to provide a new and useful mobile storage unit adapted for use in transporting and stowing selected implements such as a mechanic's tools and the like;

Another object of the present invention is to provide a new and useful storage unit which is able to be moved across a transport surface in a plurality of transport modes;

A further object of the present invention is to provide such a mobile storage unit which is also versatile in construction so that a variety of different types of storage compartments can be used as desired;

Yet another object of the present invention is to provide a mobile storage unit which can double as a conventional dolly when not being used as a tool carrier;

A still further object of the present invention is to provide a mobile storage unit which may be situated in confined areas while permitting sufficient storage of, and convenient access to, an appreciable number of tool implements;

To accomplish these objects, the present invention is directed to a mobile storage unit adapted for use in transporting and stowing selected implements, such as tools for carpenters, plumbers, or mechanics, as well as a salesman's products. The mobile storage unit broadly comprises an elongated and rigid support frame having a first end and an opposite second end. A primary wheel assembly is rotatably journaled with respect to the support frame proximate to the first end and operates in conjunction with the first end to position the support frame upright on a transport surface while permitting movement of the support frame therealong. A first storage shelf may be pivotally disposed on the support frame between the first and second ends. This first storage shelf is preferably movable between a stowed position wherein it is oriented alongside the support frame's longitudinal axis and an extended position wherein it is oriented at an angle relative to the longitudinal axis. When so oriented, the first storage shelf may receivably support a first container for the implements. A second storage shelf may be similarly constructed and mounted to the support frame such that the first and second storage shelves counterbalance one another when they are each placed in the extended position and the support frame is positioned upright on the transport surface.

It is preferred that an auxiliary wheel assembly be rotatably journaled with respect to the support frame proximate to the second end. This auxiliary wheel assembly operates in conjunction with the primary wheel assembly to movably support the support frame in a horizontal position above the transport surface when the longitudinal axis of the support frame is oriented substantially parallel thereto. One or more storage compartments can be mounted to the support frame between the first and second ends to provide additional storage space for other items. The storage compartments include access doors that are selectively movable between an opened position to permit access to the stored contents and a closed position to prevent inadvertent spillage of the stored contents when the support frame is oriented upright on the transport surface. A tool pouch or a plurality of brackets, or both, may be mounted to a side of the first storage compartments to receivable retain selected tool implements.

The mobile storage unit also includes first and second frameworks mounted to the support frame. The first framework is sized and adapted to receive a tool box for vertical transport therein when the support frame is positioned upright on the transport surface, and the second framework is adapted to receive the tool box for horizontal transport therein when the support frame is positioned horizontally above the transport surface. Preferably, the first storage shelf is positioned on the mobile unit's support frame so that when it is in the extended position it may be retained in this position by the lid of the tool box. It is also preferred that a panel insert be provided which is sized and adapted to nestably received by the first framework to permit the mobile storage unit to be more easily used as a dolly when desired. Also, to allow for added versatility, a telescopic handle is associated with the support frame so that a user may conveniently roll the support frame across the transport surface.

These and other objects of the present invention will become more readily appreciated and understood from a consideration of the following detailed description of the exemplary embodiment of the present invention when taken together with the accompanying drawings, in which:

BRIEF DESCRIPTION OF DRAWINGS

FIG. 12 is a partial left side view in elevation of the mobile storage unit with a level mounted thereon.

FIG. 13 is a partial left side view in elevation of the mobile storage unit with a tool pouch mounted thereon.

DETAILED DESCRIPTION OF THE EXEMPLARY EMBODIMENTS

Figure 1:
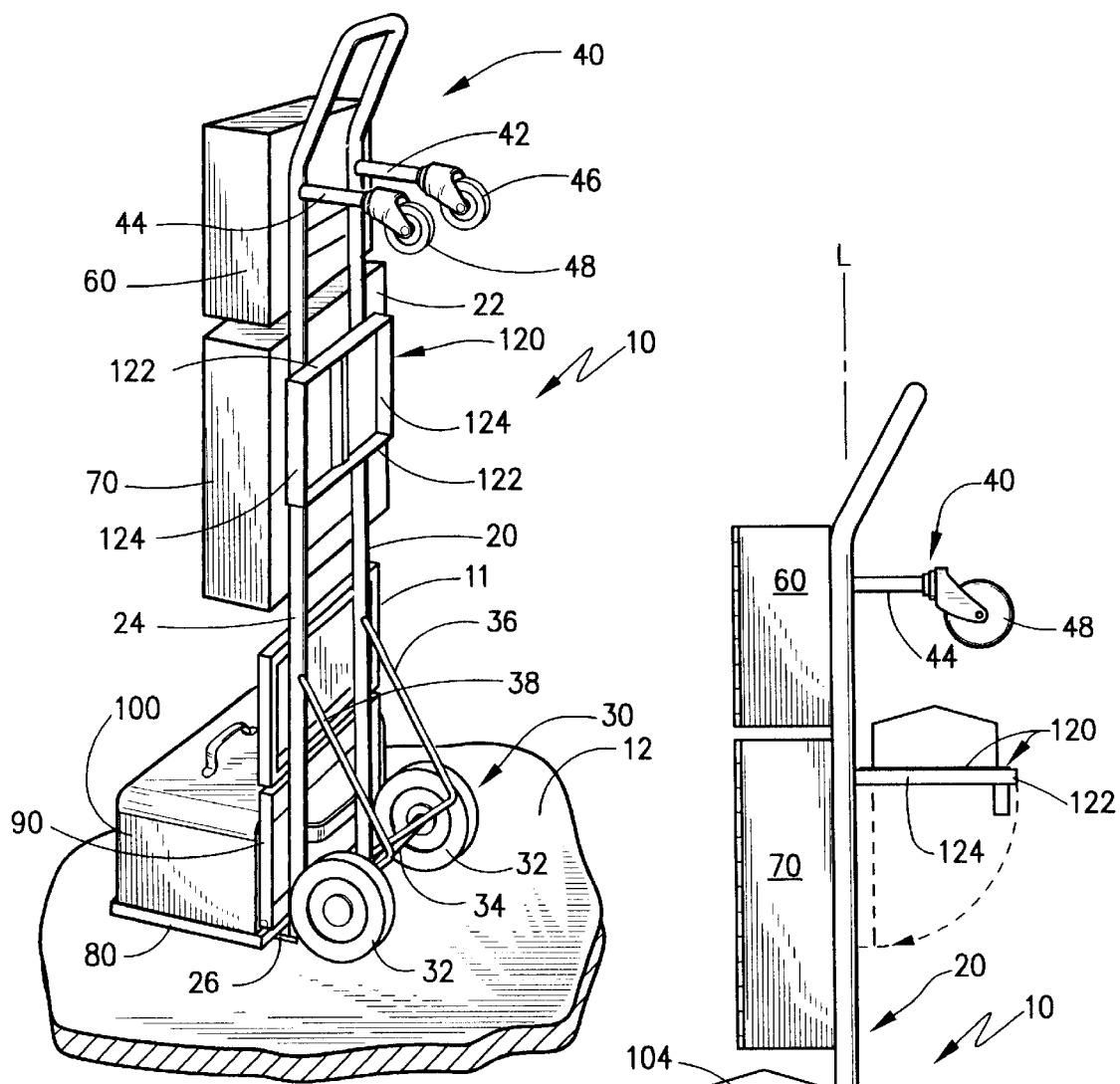
FIG. 1 is a perspective view showing the mobile storage unit according to the exemplary embodiment of the present invention shown in an upright position relative to the transport surface.

The present invention is broadly directed to a mobile storage unit especially adapted for transporting a set of tools for a craftsman. Thus, for example, the present invention may be used by auto mechanics, plumbers, electricians, carpenters and the like. It is quite suitable for the use by the ordinary handyman who desires a convenient apparatus for storing his/her tools. In any event, the storage unit of the present invention can hold a variety of tools so they can be placed in an out of the way location; however, when access is desired, the storage unit may be easily rolled into an accessible position or even transported to a distant location.

With general reference then to FIGS. 1–13, it may be seen that mobile storage unit 10 is adapted to be oriented in a first or upright position on a transport surface 12. A storage unit 10 includes an elongated and rigid support frame 20 formed by a pair of parallel, tubular members 22 and 24. A lower support plate 26 is disposed at a first end of support frame 20 and is oriented to be horizontal to support surface 12 when storage unit 10 is in the upright position shown in FIGS. 1–4.

A primary wheel assembly 30 is rotatably journaled with respect to support frame 20 at the first end thereof. To this end, primary wheel assembly 30 includes a pair of rotatable wheels 32 that are rotatably journaled about an axle 34 with axle 34 being supported by a pair of support brackets 36 and 38.

Figure 11:
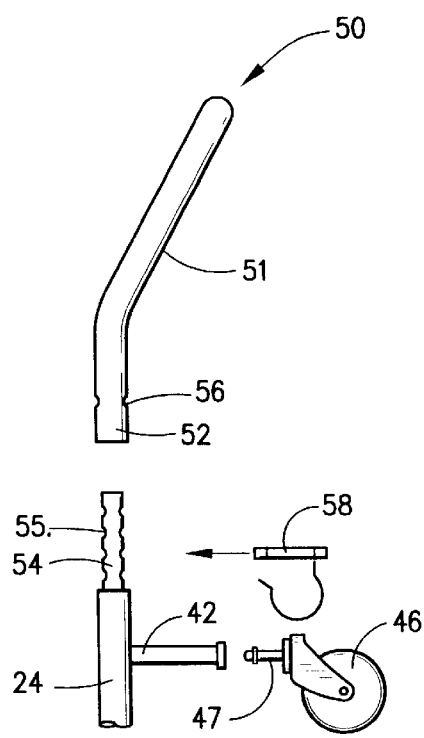
FIG. 11 is an exploded side view in elevation of the adjustable handle and auxiliary wheel assembly of the mobile storage unit shown in FIGS. 1–10.

An auxiliary wheel assembly 40, described more thoroughly below in reference to FIG. 11, is disposed proximate to a second end of support frame 20 opposite primary wheel assembly 30. Auxiliary wheel assembly 40 includes a pair of support legs 42 and 44 which are respectively affixed to tubular members 22 and 24 perpendicularly thereto so that support legs 42 and 44 project in a common direction. A pair of caster wheels 46 and 48 are disposed at the ends of legs 42 and 44 and are opposite tubular members 22 and 24, respectively. Preferably, caster wheels 46 and 48 can be selectively locked in position to prevent the mobile storage unit 10 from inadvertently moving during use.

A pair of storage compartments are mounted to and supported by a support frame 20. A first storage compartment 60 is located adjacent to the second end of support frame 20 on a side thereof opposite of support legs 42 so that first storage compartment 60 faces forwardly with support legs 42 and 44 projecting rearwardly thereof. First storage compartment 60 includes a pair of doors 62 which pivot along hinges 64 between a closed and opened position. When open, an interior 66 of storage compartment 60 becomes accessible for use. Thus, tools or other objects placed in first storage compartment 60 become accessible. When closed, doors 62 are suitably latched so that items stored in interior 66 are secured therein.

A second storage compartment 70 is disposed on a medial portion of support frame 20 on a common front side thereof with storage compartment 60. Second storage compartment 70 is located between storage compartment 60 and lower support plate 26. Here again, a pair of doors 72 are pivotally secured to storage compartment 70 along hinges 74 so that they may be moved from a closed position to an open position allowing access to an interior 76 of storage compartment 70. Doors 72 are suitably latched so that they may be latched in the closed position, thus securing items placed in the interior 76 of storage compartment 70. The ordinarily skilled artisan would appreciate that storage compartments 60 and 70 could be provided with a plurality of internal dividers or appropriately molded inserts for the storage and retention of a variety of different tool implements, such as sockets, drill bits and the like.

Figure 9:
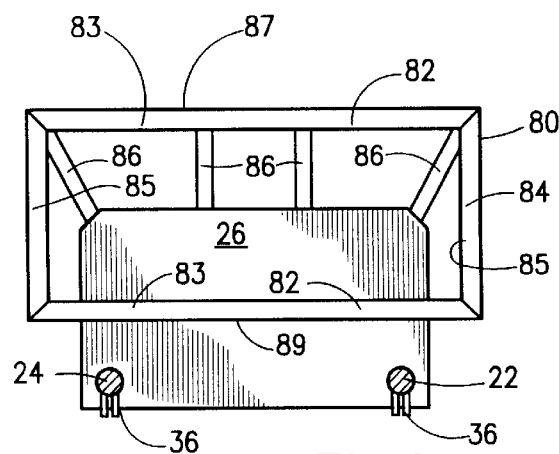
FIG. 9 is a cross-sectional view taken about line 9—9 of FIG. 5.
Figure 10:
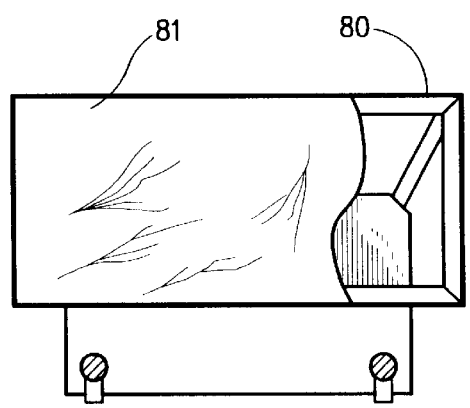
FIG. 10 is a top plan view, partially broken away and in partial cross-section, showing the insert panel for the mobile storage unit's first framework.

A first framework 80 is mounted to support frame 20 at the first end thereof. Framework 80 is sized and adapted to receive a tool box 100 which can either be of a standard size, or which can be constructed according to the present invention to fit within the first framework 80. Framework 80, as best shown in FIG. 9, is rectangular in configuration and is formed by a pair of parallel side pieces 82 which are spaced apart from one another and which are joined by a pair of parallel side pieces 84. Each of side pieces 82 and 84 are formed by angle irons so as to have horizontal webs 83, 85, respectively to support the bottom edges of tool box 100 and a pair of upright webs 87 and 89, respectively, to support the sides of tool box 100. A plurality of brace members 86 help support framework 80 to support plate 26 so that it is supported slightly forwardly of support frame 20. As shown in FIG. 10, a panel insert 81 which may be made of wood or other appropriate material, may be provided which is sized and adapted to be nestably received by first framework 80 to provide a support surface when the mobile storage unit 10 is used as a dolly. As such, this panel insert 81 is also sized and adapted to be received by second storage shelf 120 to provide more base support for tool tray 104 if desired.

Figure 4:
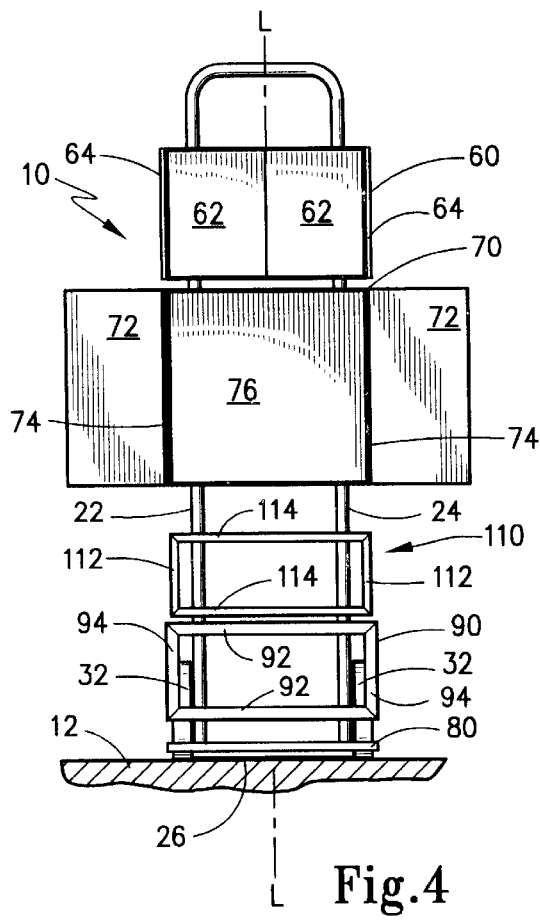
FIG. 4 is a front view in elevation of the mobile storage unit shown in FIGS. 1 and 2.

A second framework 90 is also secured to support frame 20 proximate to the first end thereof. Second framework 90 is constructed substantially identically to first framework 80 but is oriented parallel to the longitudinal axis "L" of support frame 20 so that it is perpendicular to first framework 80. Thus, as is best shown in FIG. 4, second framework 90 is rectangular in configuration and includes a pair of spaced apart, parallel side pieces 92 which are joined by parallel spaced apart side pieces 94. Each of side pieces 92, 94 are then formed of angle iron so as to provide a perpendicular webs to support the sides and bottom edges of tool box 100.

It should now be appreciated that tool box 100 may be selectively supported by first framework 80 when storage unit 10 is in the upright position with side pieces 82 and 84 operating to prohibit forward, rearward and lateral movement of tool box 100 during transport. When mobile storage unit 10 is placed in the horizontal position, as is shown in FIGS. 5 and 6, tool box 100 may be supported by second framework 90 and prevented from longitudinal and lateral movement with respect to support frame 20.

Figure 2:
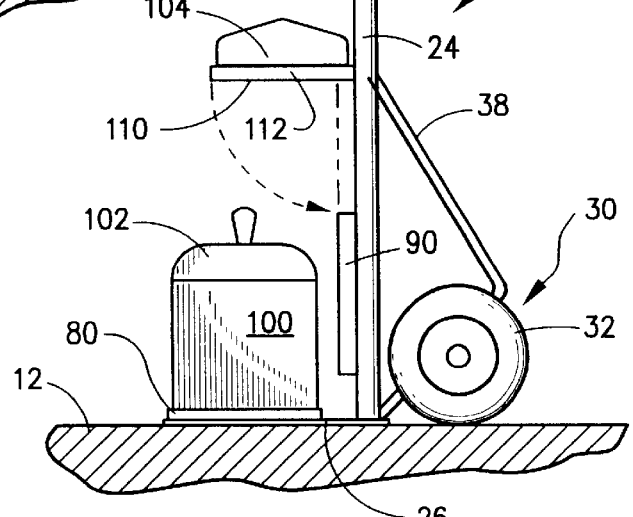
FIG. 2 is a side view in elevation of the mobile storage unit according to FIG. 1.
Figure 5:
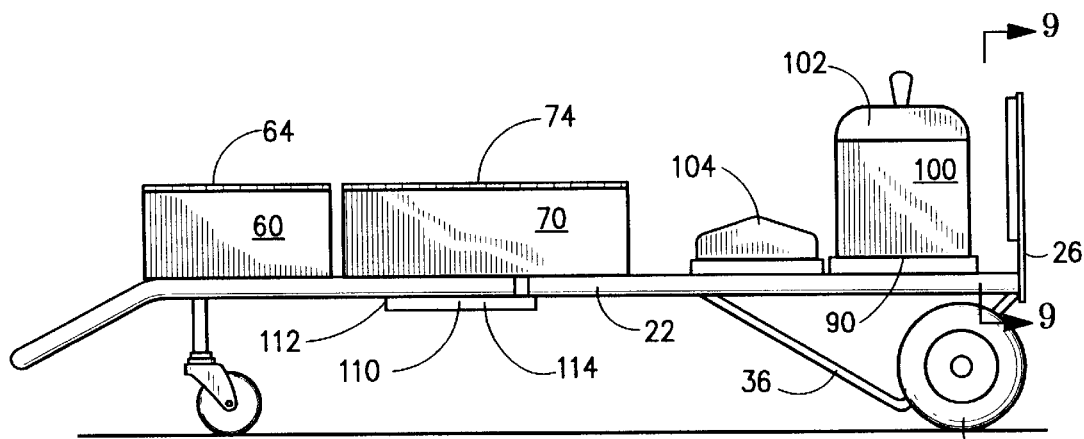
FIG. 5 is a right side view in elevation showing the mobile storage unit of FIGS. 1–3 in a second, horizontal position relative to a transport surface.
Figure 6:
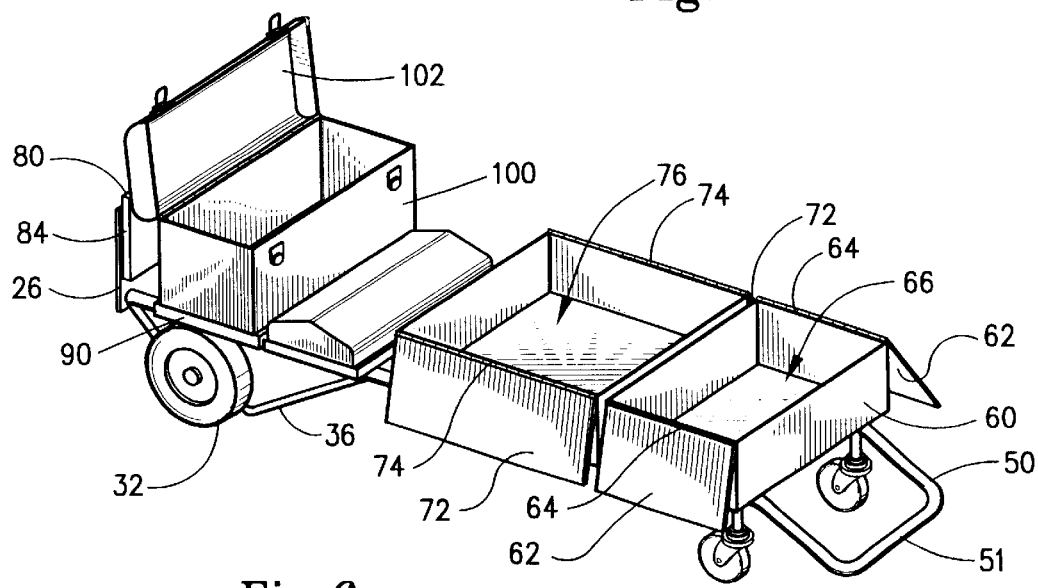
FIG. 6 is a perspective view of the mobile storage unit shown in FIGS. 1–3 and 5 in the second, horizontal position.

As is also shown in FIGS. 2, 5 and 6, tool box 100 is accessible through a lid 102 and includes a removable tray 104 as is known in the art. Tray 104 is typically provided to hold small implements or tools while large tools are normally stored in the interior of tool box 100. In any event, as described below, support shelves are provided on mobile storage unit 10 that may conveniently support removable tray 104 for ready access.

Figure 3:
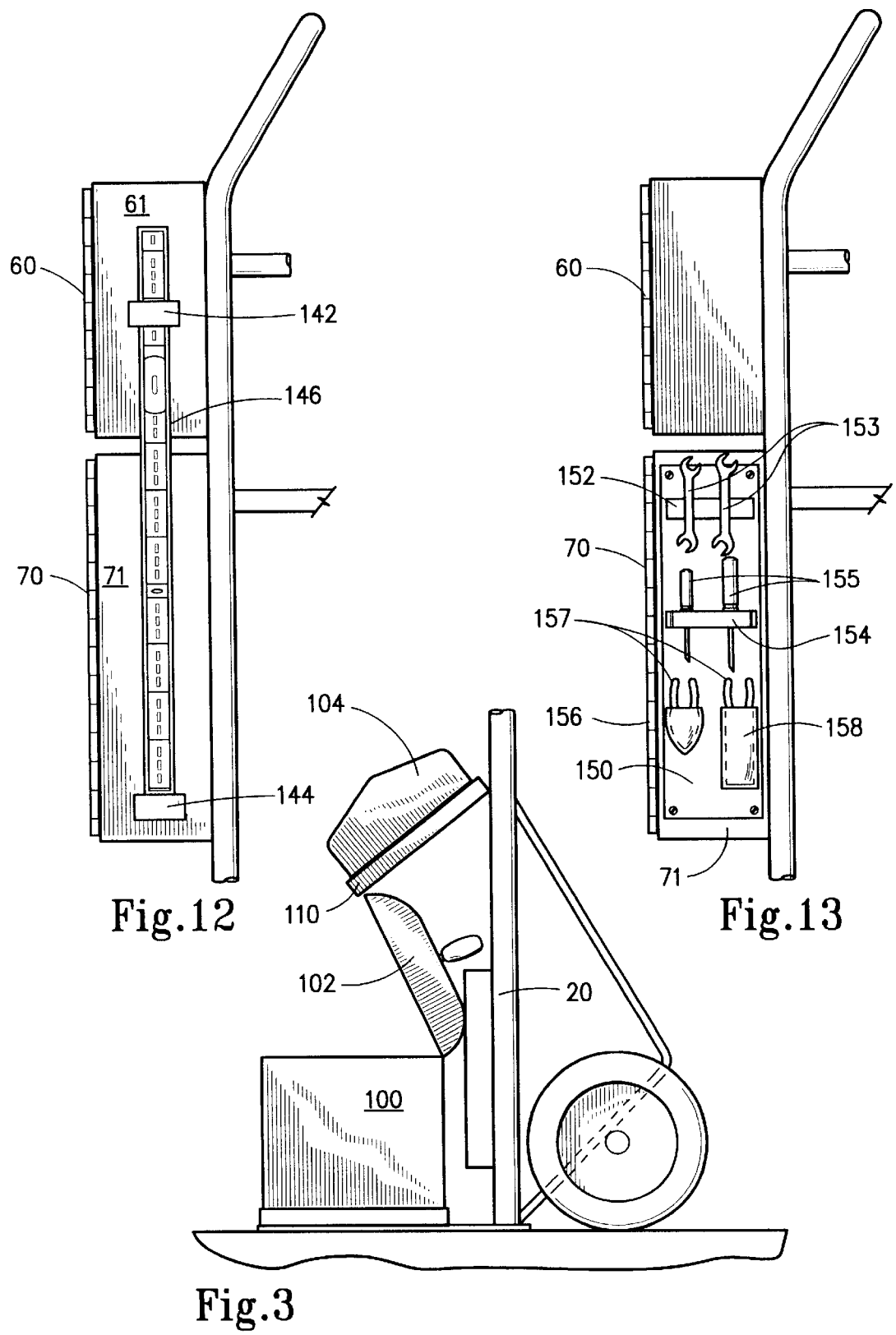
FIG. 3 is a side view in elevation showing the lower portion of the mobile storage unit with its second support shelf supported in a tilted orientation by the lid of a tool box.

Accordingly, a first storage shelf 110 is pivotally secured to support frame 20 on the forward side thereof. Storage shelf 110 pivots between an extended position wherein it is oriented at an angle relative to support frame 20 to a stowed position (shown in phantom in FIG. 2) where it is stored against support frame 20. The first storage shelf 110 may be retained in the extended position through an appropriate locking structure if desired. Alternatively, and as shown in FIG. 3 first storage shelf 110 is preferable positioned on support frame 20 at a selected height relative to tool box 100 such that, when the tool box lid 102 is opened, lid 102 may be propped against an underside of first storage shelf 110 to support it in the extended position for more convenient access to the small implements contained within tool tray 104.

Storage shelf 110 can be constructed in any convenient manner. As is shown in the figures, storage shelf 110 may again be a framework structure formed by a pair of parallel side pieces 112 that are connected by parallel side pieces 114. Side pieces 112 and 114 are again angle iron so as to provide support webs to support the bottom edges and sides of removable tray 104. It should be understood that first storage shelf 110 is slightly smaller to accommodate a slightly smaller dimension of tray 104 since tray 104 nests internally of tool box 100.

A second storage shelf 120 is provided on mobile storage unit 10 and is again operative to support removable tray 104 during use. Second storage shelf 120 is constructed substantially identical to first storage shelf 110,but slightly wider to receive panel insert 81. Storage shelf 120 is pivotally mounted between shelf 110 and the second end of support frame 20, and pivots between a stowed position (shown in phantom in FIG. 2) and an extended position wherein it is perpendicular to support frame 20. When extended, second storage shelf 120 projects rearwardly of support frame 20 and thus oppositely first storage shelf 110 when first storage shelf 110 is in the extended position. In this manner, storage shelves 110 and 120 are counterbalanced with respect to support frame 20 when mobile storage unit 10 is in the upright position.

Storage shelf 120 is again constructed as a rectangular framework having a first pair of side pieces 122 that are in parallel spaced apart relation to one another and a second pair of parallel, spaced apart side pieces 124 which join the ends of side pieces 122. Side pieces 122 and 124 are again angled pieces formed by perpendicular webs that support the bottom and sides of removable tray 104 during use.

Figure 7:
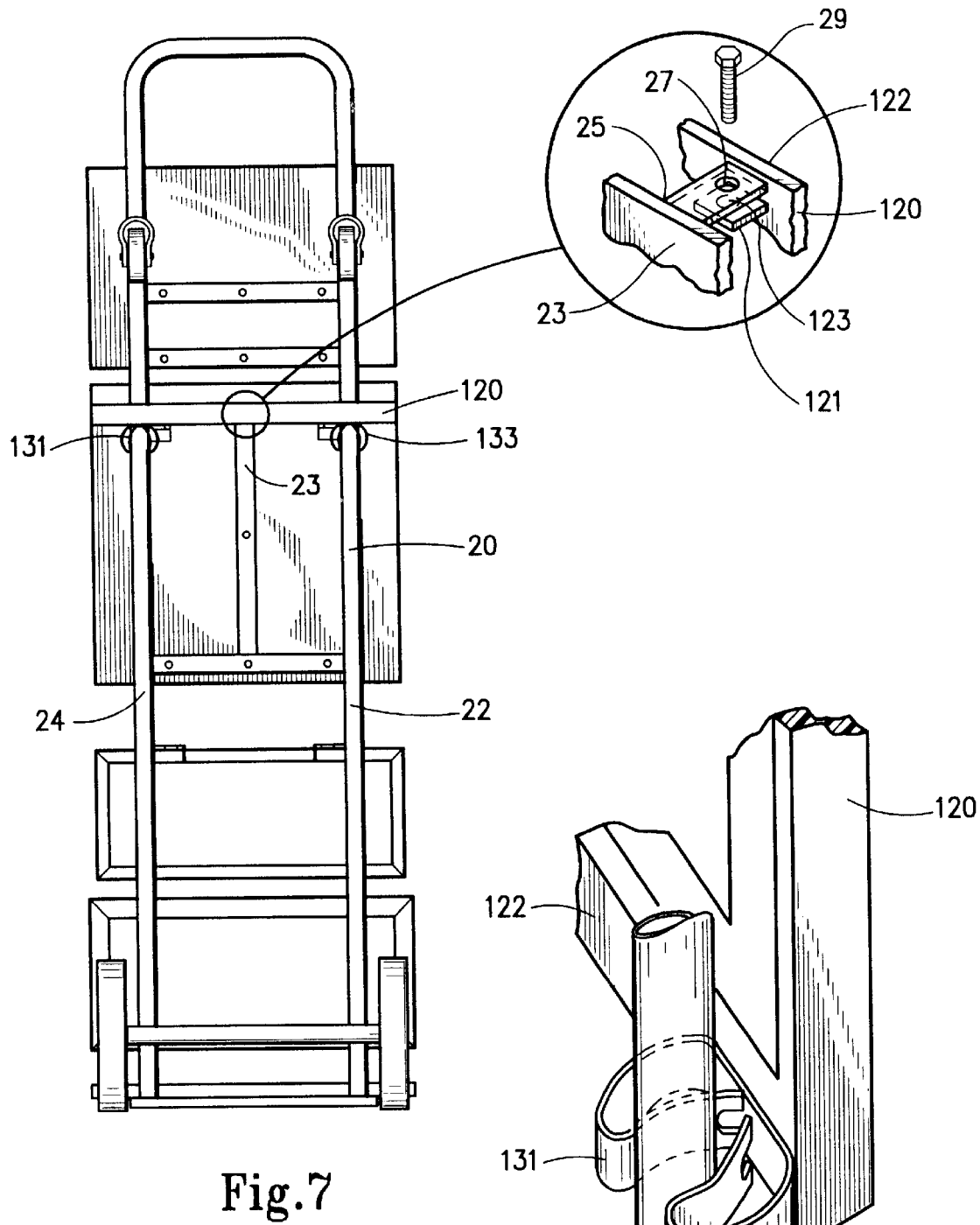
FIG. 7 is a rear view in elevation of the mobile storage unit shown in FIGS. 1 and 2, with a portion thereof enlarged to show one possible means for retaining the first storage shelf in the extended position.
Figure 8:
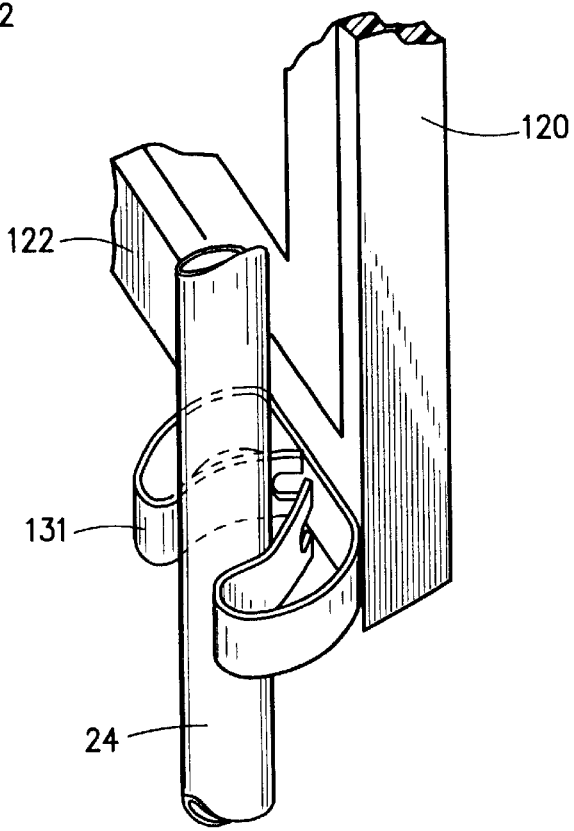
FIG. 8 is an enlarged perspective view, in partial cross-section, showing how the first storage shelf may be releasably clipped to the mobile unit's support frame when in the stowed position.

As shown in FIG. 7, support frame 20 includes a vertical bar 23 provided with a tab 25. Tab 25 has an aperture 27 formed therethrough which is alignable with an aperture 123 formed through a tab 121 associated with side piece 122 of storage shelf 120. A retainer pin 29 is sized and adapted to be received through apertures 27 and 123 to retain second storage shelf 120 in the extended position. As shown in FIGS. 8 and 9, a pair of spaced apart pressure clamps 131 and 133 are mounted to another of the first storage shelf's side pieces 122. These clamps, 131 and 133 respectively, are preferably made of metal and are adapted to releasably engage the support frame's tubular members 22 and 24 when second storage shelf 120 is placed in the stowed position (shown in phantom in FIG. 2).

Mobile storage unit 10 is provided with a handle that is sized and adapted to be grasped by a person when moving storage unit 10. To this end, as is shown in FIG. 11 the handle structure 50 is disposed at the second end of framework 20 opposite support plate 26. The handle structure 50 includes a U-shaped main body 51 that terminates in end portions 52 that are sized to be telescopically received on shank portions 54 that extend outwardly from framework 20, for example, from tubular member 24 shown in FIG. 8. Shanks 54 are provided with a plurality of throughbores 55 while end portion 52 has a throughbore 56 that is sized to register with a selected one of throughbores 55 so that a retaining pin 58 may be inserted therethrough to selectively secure a handle structure 50 thereto. Accordingly, handle structure 50 is selectively extensible on shanks 54 so that the effective length of support frame 20 may be somewhat adjustable. Of course, one of ordinary skill would appreciate that a variety of different constructions could be utilized to telescopically connect handle 50 to the support frame's tubular members. Thus, for example, end portion 52 could be of reduced dimension and of a selected length so that it is sized to be telescopically received within the tubular members 22 and 24 for infinite telescopic adjustability.

As also shown in FIG. 11, caster. wheel 46 has a projection 47 which is sized and adapted for releasable insertion into support leg 42 so that caster wheel 46 may be removed if desired. Of course, caster wheel 48 and its associated support leg 44 are constructed identically. The removability of caster wheels 46 and 48 is beneficial, for example, because it allows support legs 42 and 44 to serve as auxiliary handles when mobile storage unit 10 is being used as a dolly.

With reference now to FIGS. 12 and 13, the construction of first and second storage compartments 60 and 70 may be utilized to exteriorly support a variety of tools. For example, and with initial reference to FIG. 12, a slide bracket 142 and a socket 144 may be mounted, respectively, to side panels 61 and 71 of storage compartment 60 and 70 to receivably hold an elongated level 146. Alternatively, as shown in FIG. 13, a tool pouch 150 may be mounted through appropriate rivets or otherwise to either the first and second storage compartments 60, 70 to store a variety of tools. For illustrative purposes only, FIG. 13 shows that a magnetic element 152 may be employed to hold metal wrenches 153, securement straps 154 may be provided to hold a plurality of tools, such as screwdrivers 155, and appropriately sized pockets 156 and 158 may be disposed on pouch 150 to hold pliers 157 or the like. Of course, this should be readily understood by the ordinarily skilled artisan, that either or both of the opposite sides of storage compartment 60 and 70 may be used to mount tools in the manner shown in FIGS. 12 and 13.

In use, then, it may now be appreciated that mobile storage unit 10 permits several modes of operation. For example, when in the upright position, such as shown in FIG. 2, the craftsman may remove tray 104 from tool box 100 and support tray 104 alternatively on storage shelves 110 or 120. Thus, access to the contents of tool box 100 as well as to those implements or other items placed in tray 104 are readily available. Concurrently, any tools or other implements in storage compartments 60 and 70 may be accessed through doors 62, 72 respectively. When in the position shown in FIG. 2, the user may wheel the entire set of tools and implements from location to location.

Sometimes, however, it is desirable that mobile storage unit 10 be placed in horizontal orientation for use. Thus, as is shown in FIGS. 5 and 6, the craftsman may place mobile storage unit 10 in a horizontal position so that support frame 20 is parallel to and spaced above transport surface 12. In this position, support frame 20 is supported by wheel assemblies 30 and 40. Wheel assemblies 30 and 40 allow mobile storage unit 10 to be rolled along transport surface 12 while positioned horizontally. Moreover, when in the horizontal position, tool box 110 may be moved from first framework 80 to be supported in second framework 90 and tray 104 may be supported in first storage shelf 110 while storage shelf 110 is in the stowed position. Access to compartments 60 and 70 is still available through doors 62 and 72, respectively.

Figure 14:
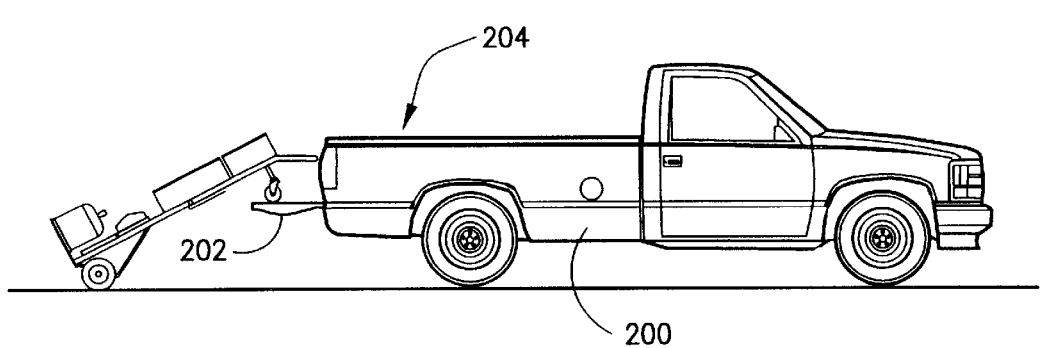
FIG. 14 is a side view in elevation showing that the loading of the mobile storage unit onto a transport vehicle.

Finally, with reference to FIG. 14, it may be seen that mobile storage unit 10 is conveniently loadable onto a transport vehicle such as truck 200. This loading is facilitated by wheel assembly 40. As may be seen, the user may simply maneuver storage unit 10 into position so that wheel assembly 40 is supported, for example, on tailgate 202 of truck 200. After placing wheel assembly 40 on tailgate 202, the user simply lifts the first end of storage unit 10 onto tailgate 202 while rolling wheel assembly 40 into bed 204 of truck 200. It should also be appreciated that the adjustability of the storage units handle allows the device to be loaded onto other vehicles having higher beds.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiment of the present invention without departing from the inventive concepts contained herein.

I claim:

1. A mobile storage unit adapted for use in transporting and stowing selected implements, comprising;
   (a) an elongated and rigid support frame having a first end and an opposite second end;
   (b) a primary wheel assembly rotatably journaled with respect to said support frame proximate to said first end and operative in conjunction with said first end to position said support frame upright on a transport surface while permitting movement of said support frame therealong;
   (c) an auxiliary wheel assembly rotatably journaled with respect to said support frame proximate to said second end, said auxiliary wheel assembly operative in conjunction with said primary wheel assembly to movably support said support frame in a horizontal position above the transport surface when the longitudinal axis of said support frame is oriented substantially parallel thereto; and
   (d) a first storage shelf pivotally disposed on said support frame between said first and second ends, said first storage shelf selectively movable between a stowed position wherein said first storage shelf is oriented alongside a longitudinal axis of said support frame and an extended position wherein said first storage shelf is oriented at an angle relative to the longitudinal axis such that said first storage shelf may receivably support a first container for said implements; and
   (e) a second storage shelf pivotally disposed on said support frame between said first and second ends, said second storage shelf selectively movable between a stowed position wherein said second storage shelf is oriented alongside the longitudinal axis and an extended position wherein said second storage shelf is oriented at an angle relative to the longitudinal axis such that said second storage shelf may receivably support a second container for said implements.

2. A mobile storage unit according to claim 1 wherein said first and second storage shelves are mounted to said support frame in such a manner that they counterbalance one another when said support frame is positioned upright on the transport surface and each said shelf is place in the extended position.

3. A mobile storage unit according to claim 1 including at least a first storage compartment disposed on said support frame between said first and second ends, said first storage compartment sized and adapted to store selected ones of said implements.

4. A mobile storage unit according to claim 3 including a tool pouch mounted to said first storage compartment for holding a plurality of said implements.

5. A mobile storage unit according to claim 3 including a plurality of brackets mounted to said first storage compartment for receivably holding a level.

6. A mobile storage unit according to claim 5 wherein said first storage compartment includes an access door selectively movable between an opened position to permit access to said implements and a closed position to prevent inadvertent spillage of said implements when said support frame is oriented upright on the transport surface.

7. A mobile storage unit according to claim 1 including a plurality of storage compartments mounted to said support frame between said first and second ends, each of said storage compartments sized and adapted to store selected ones of said implements.

8. A mobile storage unit according to claim 7 wherein each of said storage compartments includes an access door selectively movable between an opened position to permit access to said implements and a closed position to prevent inadvertent spillage of said implements when said support frame is oriented upright on the transport surface.

9. A mobile storage unit according to claim 1 including a framework mounted to said support frame, said framework sized and adapted to receive a tool box for horizontal transport therein when said support frame is positioned horizontally above the transport surface.

10. A mobile storage unit according to claim 1 including a telescopic handle associated with said support frame to allow a user to conveniently roll said support frame across the transport surface.

11. A mobile storage unit adapted for use in transporting and stowing selected implements, comprising;
　(a) an elongated and rigid support frame having a first end and an opposite second end;
　(b) a primary wheel assembly rotatably journaled with respect to said support frame proximate to said first end and operative in conjunction with said first end to position said support frame upright on a transport surface while permitting movement of said support frame therealong;
　(c) an auxiliary wheel assembly rotatably journaled with respect to said support frame proximate to said second end, said auxiliary wheel assembly operative in conjunction with said primary wheel assembly to movably support said support frame in a horizontal position above the transport surface when the longitudinal axis of said support frame is oriented substantially parallel thereto;
　(d) a first storage shelf pivotally disposed on said support frame between said first and second ends, said first storage shelf selectively movable between a stowed position wherein said first storage shelf is oriented alongside a longitudinal axis of said support frame and an extended position wherein said first storage shelf is oriented at an angle relative to the longitudinal axis such that said first storage shelf may receivably support a first container for said implements; and
　(e) a removable panel insert sized and adapted to be nestably received by said first framework and said first storage shelf.

12. A mobile storage unit adapted for use in transporting and stowing selected implements, comprising:
　(a) an elongated and rigid support frame having a first end and an opposite second end;
　(b) a primary wheel assembly rotatably journaled with respect to said support frame proximate to said first end and operative in conjunction with said first end to position said support frame upright on a transport surface while permitting movement on said support frame therealong;
　(c) an auxiliary wheel assembly rotatably journaled with respect to said support frame proximate to said second end, said auxiliary wheel assembly operative in conjunction with said primary wheel assembly to movably support said support frame in a horizontal position above the transport surface when a longitudinal axis of said support frame is oriented substantially parallel thereto;
　(d) a tool box including a storage tray;
　(e) at least a first storage shelf pivotally disposed on said support frame between said first and second ends, said first storage shelf movable between a stowed position wherein said first storage shelf is oriented alongside the longitudinal axis of said support frame and an extended position wherein said first storage shelf is oriented at an angle relative to the longitudinal axis such that said first storage shelf may receivably support said tool tray;
　(f) a first framework mounted to said support frame and extending perpendicularly to the longitudinal axis, said first framework sized and adapted to nestably receive said tool box for vertical transport therein when said support frame is positioned upright on the transport surface said first storage shelf being positioned on said support frame relative to said tool box such that it may be supported in the extended position by a lid of the tool box when the tool box is received by said first framework; and
　(g) a second framework mounted to said support frame and extending parallel to the longitudinal axis, said second framework sized and adapted to nestably receive the tool box for horizontal transport therein when said support frame is positioned horizontally above the transport surfaces.

* * * * *